United States Patent [19]

Rinn

[11] Patent Number: 4,981,819

[45] Date of Patent: Jan. 1, 1991

[54] PROCESS FOR THE PREPARATION OF A SUSPENSION CONTAINING SPHERE-SHAPED OXIDE PARTICLES

[75] Inventor: Günter Rinn, Lahnau, Fed. Rep. of Germany

[73] Assignee: Fraunhofer-Gesellschaft Zur Forderung Der Angewandten Forschung e.V., Munich, Fed. Rep. of Germany

[21] Appl. No.: 418,647

[22] Filed: Oct. 10, 1989

[30] Foreign Application Priority Data

Oct. 12, 1988 [DE] Fed. Rep. of Germany ....... 3834774

[51] Int. Cl.$^5$ .............................................. C03C 3/00
[52] U.S. Cl. ..................................................... 501/12
[58] Field of Search ........................................... 501/12

[56] References Cited

U.S. PATENT DOCUMENTS

| 4,714,567 | 12/1987 | Roha | 501/12 |
| 4,801,399 | 1/1989 | Clark | 501/12 |
| 4,851,150 | 7/1989 | Hench | 501/12 |
| 4,879,065 | 11/1989 | Sterzel | 501/12 |

Primary Examiner—Peter D. Rosenberg
Attorney, Agent, or Firm—Oblon, Spivak, McClelland, Maier & Neustadt

[57] ABSTRACT

A process is described for the preparation of a suspension containing sphere-shaped oxide particles, in which process there is emulsified in an organic liquid an aqueous phase containing at least one element which can be precipitated as an oxide (hydrate) in dissolved form or in the form of a sol. In this process there is dissolved in this organic liquid before, during or after formation of the emulsion at least one compound which acts as a phase transfer catalyst, and which can replace the anions or cations present in the emulsified water droplets by hydroxide ions or protons and which can thereby cause precipitation of the oxide in the droplets.

15 Claims, No Drawings

PROCESS FOR THE PREPARATION OF A SUSPENSION CONTAINING SPHERE-SHAPED OXIDE PARTICLES

BACKGROUND OF THE INVENTION

The present invention relates to a process for the preparation of a suspension which contains sphere-shaped oxide particles, and in particular to a process in which the sphere-shaped oxide particles are prepared in a water-in-oil emulsion with the aid of a compound which acts as a phase transfer catalyst. The invention furthermore relates to the use of the suspensions obtained in such a process for the preparation of (ceramic) oxide powders and/or (ceramic) shaped articles.

A plurality of processes for the preparation of powders from emulsions is described in the literature. An example of this is the emulsification of metal alkoxides in liquids which are immiscible therewith (for example paraffin oil or propylene carbonate), followed by hydrolysis. The main disadvantage of this process is that the required alkoxides are relatively expensive compounds. In another existing process, salt solutions or stabilized sols are emulsified in hydrocarbons, and then, for example, ammonia is passed in to precipitate hydroxides, and the resulting mixture is added dropwise to boiling hydrocarbons so that the water evaporates, or the mixture is freeze-dried. The dry powders which can be obtained by this process contain the anions in the form of metal salts or ammonium salts. Thermal decomposition, which then takes place, brings about disintegration of the particles or the formation of open-pore, sponge-like structures. High green densities and good sinter properties can only be achieved by these processes in individual cases, if at all.

In yet another existing process the extraction of acids or anions of acid salts from emulsified aqueous phases is achieved by adding long-chain amines to the organic phase. However, a complete exchange requires a large excess of amines or step-wise extraction. Such a process is not capable of splitting neutral salts (for example alkali metal compounds or alkaline earth metal compounds).

SUMMARY OF THE INVENTION

Accordingly, it is an object of the present invention to provide a process for the preparation of a suspension which contains sphere-shaped oxide particles, in which process there is emulsified in an organic liquid an aqueous phase containing at least one element which can be precipitated as an oxide (hydrate), in dissolved form or in the form of a sol, and which is intended to have, in particular, the following advantages:
- Extraction of anions (cations) is also possible from neutral salt solutions and leads to the formation and precipitation of oxides (oxide hydrates) within the emulsion droplets.
- Inexpensive, inorganic starting compounds can be employed.
- The process leads to suspensions which can be further processed to give compact, spherical powders having a homogeneous chemical composition and good compaction and sinter properties.
- The organic phase as well as the compound which causes precipitation of the oxide (hydrate) can readily be recycled or regenerated.

These advantages and others which will be illustrated below are obtained according to the invention by a process for the preparation of a suspension which contains sphere-shaped oxide particles, in which process there is emulsified in an organic liquid an aqueous phase containing at least one element which can be precipitated as an oxide (hydrate), in dissolved form or in the form of a sol, and in which process there is dissolved in this organic liquid before, during or after the formation of the emulsion at least one compound which acts as a phase transfer catalyst and which can replace the anions or cations present in the emulsified water droplets by hydroxide ions or protons and which can thereby cause precipitation of the oxide (hydrate) in the droplets.

DETAILED DESCRIPTION OF THE INVENTION

In what follows, the process according to the invention will be illustrated in greater detail.

The aqueous phase to be emulsified in the organic liquid contains at least one element which is in dissolved form or in the form of a sol and which can be precipitated as an oxide (hydrate) by raising or lowering the pH.

Elements which are preferred according to the invention are those which are suitable for the preparation of glass or ceramics. Examples which may be mentioned in this context are metals in general, in particular alkali metals (for example Li, Na, K), alkaline earth metals (for example Mg, Ca, Sr and Ba), other main group metals, such as, for example, Al, Sn, Pb or Bi, sub-group metals, such as, for example, Ti, Zr, V, Mn, Nb, Ta, Cr, Mo, W, Fe, Co, Ni, Cu or Zn, and the lanthanides, for example Ce and Y. Non-metals, such as, for example, Si, B and P are also suitable according to the invention.

Preferred examples for oxides to be precipitated are, inter alia, $ZrO_2$, $TiO_2$, lead zirconate titanate (PZT), $BaTiO_3$, $Al_2O_3$, $YBa_2Cu_3O_7$, $ZrSiO_4$, $Al_6Si_2O_{13}$ and $Mg_2Al_4Si_5O_{18}$.

The above elements are preferably present in the emulsified aqueous phase in as high a concentration as possible. The higher the concentration, the greater the guarantee that sphere-shaped particles are formed.

High concentrations can be obtained, for example, using aqueous salt solutions, or aqueous sols which have been peptized under acid conditions, and their combinations.

If cations are to be precipitated as an oxide (hydrate), preferred salt solutions are those which have anions which readily undergo thermal decomposition, in particular nitrates, sulfates and anions of organic acids, such as acetates and formates. The nitrate ion is particularly preferred since it has a high affinity to anion-exchanger resins, which is advantageous if an anion-exchanger resin is employed for regenerating the compound acting as the phase transfer catalyst.

Acids which dissociate into the abovementioned anions are preferred in those cases when the sol is to be peptized under acid conditions. Peptized sols are to be preferred to the aqueous salt solutions in particular in those cases where the compound acting as the phase transfer catalyst is regenerated using ion exchangers, since the salt solutions contain a large number of anions to be exchanged and therefore cause more rapid exhaustion of the exchanger medium.

Aqueous salt solutions and sols can be prepared using a variety of processes known to those skilled in the art. In the simplest case, the salt in question can simply be dissolved in water. Examples of other possibilities are dialysis of salt solutions, hydrolysis of alcoholates (for example in the case of zirconium), peptization of freshly precipitated hydroxides (for example in the case of aluminum), mixing of the sol with a salt solution or a peptized hydroxide etc. Specific examples for these processes will be mentioned further below.

To form a water-in-oil emulsion, the aqueous phase is emulsified in an organic liquid. The emulsification process is expediently carried out in the presence of an emulsifier, preferably of a non-ionic emulsifier. Suitable organic liquids are generally all organic solvents which are inert under the reaction conditions and which are virtually water-immiscible. Examples of these liquids are (optionally halogenated, in particular fluorinated or chlorinated) aliphatic and aromatic hydrocarbons (for example hexane, heptane, decane, petroleum ether fractions, kerosene, mineral oil, benzene, toluene, xylene), higher alcohols (for example alcohols having 6 to 8 carbon atoms), ethers (such as, for example, tetrahydrofuran, dioxane, and ethers derived from polyethylene glycol and polypropylene glycol), esters and ketones.

Preferred organic liquids according to the invention are petroleum ether fractions (boiling range for example 50 to 70° C. or 100° to 140° C.), hexane, heptane, toluene, the xylenes, and halogenated hydrocarbons (such as, for example, chloroform and chlorobenzene. In any case, the boiling point of the solvent should be below its decomposition point. Since the organic solvent will later be removed, preferably quantitatively, it should not have too high a boiling point, in particular a boiling point considerably above 180° C. On the other hand, nor should the boiling point be too low, i.e., not considerably below 50° C., since this may cause difficulties when water may have to be removed at a later point in time.

The best solvent for a given system depends on many factors, for example on the nature of the emulsifier employed, the compound which acts as the phase transfer catalyst and the type of the oxide (hydrate) to be precipitated, and it can be determined by simple standard experiments.

Emulsifiers which can be used are non-ionic, but also cationic and anionic emulsifiers Non-ionic emulsifiers are preferred since they permit processes to be carried out in a wide pH range and, on the other hand, do not introduce inorganic impurities into the system. In general, the emulsifier should be capable of forming a water-in-oil emulsion Emulsifiers of this type usually have a HLB value of less than 7, but water-in-oil emulsions can also be obtained in individual cases when emulsifiers having HLB values of 11 or more are used. This is because the type of emulsion depends not only on the emulsifier employed but also on the liquid used as the organic phase, the volumetric ratio of the phases etc. A survey of the interrelations in the formation of emulsions and the influences of various factors on the properties of oxide particles formed in such emulsions can be found in M. Akinc and K. Richardson, "Preparation of ceramic powders from emulsions", Mat. Res. Soc. Symp. Proc., Vol. 73, 1986, Materials Research Society. Reference is made to the comments made therein.

Specific examples of non-ionic emulsifiers which are particularly suitable according to the invention are sorbitan esters of lauric, palmitic, stearic and oleic acid (for example those commercially available under the trade mark Span®), polyoxyethylene derivatives of these esters (for example those commercially available under the trade mark Tween®) and alkyl(phenol) polyglycol ethers and fatty acid polyglycol esters (for example those commercially available under the trade mark Emulsogen®). Other examples which can be mentioned are emulsifiers of the Arlacel®, Pluronic®, Emulan®, Malophen® and Malovet® type. Of course, the aforementioned emulsifiers only represent a small selection from amongst the w/o emulsifiers which can be employed according to the invention.

Examples of anionic w/o emulsifiers are salts of high-ermolecular fatty acids containing divalent and trivalent cations, for example calcium, magnesium, aluminum and lithium. Examples of cationic emulsifiers are fatty amines and quaternary ammonium compounds. Finally, it is also possible to employ ampholytic emulsifiers, such as, for example, long-chain substituted amino acids and betains.

It is perferable to employ the emulsifier in an amount of 0.1 to 25%, preferably 1 to 20% by weight, relative to the organic phase. However, in individual cases, concentrations which are lower or higher than the aforementioned can also be advantageous.

According to the invention, the proportion of the aqueous phase in the emulsion is preferably 5 to 50, in particular 15 to 45, and particularly preferably 20 to 40% by volume. While there is no minimal value in practice for the volumetric proportion of the aqueous phase, it is generally very difficult to obtain a relatively stable w/o emulsion when the volumetric proportion of the aqueous phase is 50% or more.

To prepare the emulsion, it is possible to use techniques known to those skilled in the art. For example, the emulsifier can first be dissolved in the organic liquid, and the aqueous phase is then added all at once or in portions, for example with stirring. The emulsion is preferably prepared at room temperature or at slightly increased temperatures (for example 40° to 50° C.). Apparatus which can be used are, for example, ultrasonic equipment or rotor/stator systems having high shear rates. Specific emulsifiers and suitable apparatus (for example high-pressure homogenizer) make it possible to prepare emulsions of droplet size distributions down to the submicron range and a clear-cut upper limit. The size of the particles which form in the further progress of the process is determined by the droplet size of the emulsion and the solids content of the aqueous solution. The larger the emulsified water droplets, the larger later on the oxide particles in the suspension In general, droplet sizes of more than 20 μm lead to the (in general undesired) formation of hollow spheres. If the suspensions prepared according to the invention are to be processed to form ceramic materials, the droplet size is preferablY 5 μm or less, which corresponds to a final size (after calcination) of 1 to 2 μm. The preferred lower limit for the droplet size is a function of the desired size of the oxide particles.

Another procedure for the formation of the w/o emulsion involves converting an o/w emulsion into a w/o emulsion by adding an organic liquid.

One of the most important aspects of the process according to the invention is the addition to the organic phase of a compound which acts as a phase transfer catalyst and which is capable of replacing the anions (or cations) present in the emulsified water droplets by hydroxide ions (or protons), thus causing the oxide (hydrate) to precipitate in the droplets.

According to a particularly preferred embodiment of the present invention, neutral or basic (metal) oxides are precipitated in the droplets, so that the compound which acts as the phase transfer catalyst is bound to replace the anions present in the water droplets (for example nitrate, sulfate, formate, acetate, etc.) by hydroxide ions. In what follows, the process according to the invention will be illustrated with reference to this preferred embodiment. Acid oxides are precipitated analogously.

Examples of the compound which acts as the phase transfer catalyst are a quaternary ammonium compound, a phosphonium compound or another onium compound. Crown ethers and kryptans, inter alia, are also suitable according to the invention.

Ammonium compounds are preferred because they are readily accessible and because of their price. Examples which are particularly preferred are the quaternary ammonium salts, in particular tetraalkylammonium chlorides, tetraalkylammonium bromides and tetraalkylammonium iodides. In these tetraalkylammonium salts, the alkyl radicals, which can be identical or different, preferably have 1 to 20 carbon atoms. The total carbon number should be high enough that the salts are virtually insoluble in water, and is therefore preferably higher than 15, in particular higher than 20. Representatives of tetraalkylammonium salts which have proven particularly suitable are those which are provided with two to three long radicals (for example having 8 to 20 carbon atoms) and one or two short alkyl groups (for example one or two methyl or ethyl groups). An example of such a compound is didodecyldimethylammonium bromide. Another preferred class of tetraalkylammonium salts are those which are provided with one long hydrocarbon radical (for example having 16 or more carbon atoms) and three short alkyl groups (for example methyl or ethyl groups). An example of such a compound is octadecyltrimethylammonium bromide. In general, it can be said that tetraalkylammonium salts having radicals which are different from one another are usually more advantageous than those having four identical radicals. The alkyl radicals can also be substituted, for example by a phenyl group (for example benzylammonium salts). When selecting the tetraalkylammonium salt, it must also be taken into consideration that salts which have long alkyl chains can act as surfactants. Accordingly, simple standard experiments must be carried out to determine the most suitable phase transfer catalyst for each individual case.

The compound which acts as the phase transfer catalyst can be dissolved in the organic liquid, but also in the finished emulsion. This can be carried out at room temperature or at a slightly increased temperature, preferably with stirring. If it is possible to dissolve the compound which acts as the phase transfer catalyst in the organic phase before the emulsification process, this has the advantage of simplifying the recycling of the organic phase.

To facilitate the dissolution of the phase transfer catalyst in the organic liquid or in the organic phase of the emulsion, it is preferred to dissolve it in the smallest possible volume of a good solvent, in particular an alcohol having 4 to 8 carbon atoms, preferably hexanol, heptanol or octanol. The solvent for the phase transfer catalyst should be virtually insoluble in water so that a clear-cut phase separation in the emulsion is guaranteed.

The compound which acts as the phase transfer catalyst, for example the tetraalkylammonium salt, can already be employed in the form of a hydroxide and also in stoichiometric amounts relative to the anions to be exchanged which are present in the aqueous phase. However, it is preferred to use the compound which acts as the phase transfer catalyst in substoichiometric amounts, in particular 1 to 20%, preferably 5 to 10%, relative to the ions (anions) to be exchanged which are present in the aqueous phase. In this case, of course, the phase transfer catalyst should be regenerated batchwise or continuously. According to a particularly preferred embodiment of the present invention, anion exchange and regeneration of the phase transfer catalyst occur simultaneously. If the phase transfer catalyst is present in the hydroxide form from the very beginning, this has the additional advantage that the first exchange occurs spontaneously, and hydroxides are immediately formed at the surface of the water droplets, which stabilizes the emulsion considerably so that this procedure is particularly recommended in the case of emulsions whose stability is low.

Regenerating agents which are preferably employed for the compound which acts as the phase transfer catalyst are ion-exchanger resins. If the phase transfer catalyst is to exchange anions against hydroxide ions, an anionic ion-exchanger resin is used, while in the case of a compound which must exchange cations against protons, the regenerating agent is a cationic ion-exchanger resin.

Suitable ion-exchanger resins according to the invention are those which are customary and commercially available. They come under trade marks such as Permutit, Lewatit, Amberlite, Amberlyst, Dowex, Wofatit etc. Inorganic ion exchangers, such as, for example, zeolites, montmorillonites, attapulgites, bentonites and aluminum silicates, can also be used.

The compound which acts as the phase transfer catalyst can be regenerated in various ways. For example, the emulsion together with the phase transfer catalyst can be passed through an ion-exchanger column, the residence time of the emulsion on the column being chosen such that exchange and regeneration of the phase transfer catalyst are complete. For this purpose, the emulsion can also be passed over the column several times However, as already mentioned above, it is also possible to employ the phase transfer catalyst in stoichiometric amounts, to remove it after the exchange has taken place, to regenerate it and to re-use it.

When phase transfer catalyst and regenerating agent are selected, it is self-evident to bear in mind that, for example, only an anion-exchanger resin which is more basic than the hydroxide form of the tetraalkylammonium salt can regenerate the latter. Likewise, the phase transfer catalyst in the process according to the invention should be more basic in its hydroxide form than the oxide (hydrate) which is to be precipitated. An analogous train of thought is applicable in the case of an exchange of cations, in which cationic ion exchangers can be employed as the regenerating agent and, for example, salts of long-chain organic acids (for example fattY acids and the analogous sulfonic acids) as the phase transfer catalyst If the emulsion is passed over a column or regenerated over an ion-exchanger membrane, it is easy to check if exchange or regeneration have already been brought to completion by using indicator strips (pH indicator strips or ion-selective indicator strips)

When the desired oxide (hydrate) is precipitated (completely), the emulsion which was employed at the beginning is present in the form of a suspension of sphere-shaped oxide particles It is preferable to separate the water from this suspension in order to compact the oxide particles and to stabilize them. To this end, the water is subjected to azeotropic distillation (preferably under atmospheric pressure) Further small amounts of hydroxides dissolved in the aqueous phase precipitate upon removal of water Azeotropic mixtures containing 20 to 40% of water are achieved, for example, by adding a small amount (for example 5% by volume of the emulsion) of (n-)butanol and/or (n-)pentanol, i.e., alcohols which are still $H_2O$-miscible to a certain extent, to water/petroleum spirit mixtures. The water can be separated from the distillate by means of a Dean-Stark water trap. If appropriate, the organic phase can be recycled.

The resulting oxide particles can now be isolated for example by filtration or centrifugation, rinsing and drying, or redispersing and spray-drying. Under suitable conditions this gives agglomerate-free powders of sphere-like, relatively densely compacted particles. These powders can be further processed in a customary manner, for example by calcining them, and, if appropriate, subsequently converting them into shaped articles by compressing and sintering. However, the powder suspension obtained can also be processed directly or after water has been removed, for example by feeding it to a filter press and processing it there to shaped articles.

The oxide (hydrate) particles obtainable according to the invention from which the water has been removed in a suitable manner usually show a very low annealing loss on calcining (about 10 to 20%). Compared with mixed-oxide processes, the crystalline phases are formed at considerably lower temperatures. The individual particles in this process are compacted without the formation of hard agglomerates by beginning sintering mechanisms. These powders can subsequently be subjected to a processing step without grinding processes and hence without impurities due to abrasion.

Compressing experiments using a variety of powders without the addition of compressing auxiliaries resulted in compressed particles of 55 to 65% of the theoretical density. It was then possible to sinter these particles without pressure to a density nearly as high as the theoretical density.

In summary, the process according to the invention shows the following considerable advantages, inter alia:

Extraction of (an)ions is also possible from neutral salt solutions and leads to the formation and precipitation of hydroxides within the emulsion droplets.

Lower concentrations of the compound which acts as the phase transfer catalyst suffice to achieve complete exchange. These compounds can be regenerated continuously by an exchanger medium.

Media which are possible as exchangers are ion-exchanger resins, but also, for example, aqueous or solid bases (for example NaOH pellets) which can be kept separate from the emulsion by diaphragms or ion-exchanger membranes.

The exchanger media are either very cost-effective or can be regenerated in a simple manner; the organic solvents can be recycled.

Inexpensive, inorganic starting compounds can be employed.

The process according to the invention yields compact, spherical powders which have a homogeneous chemical composition and good compaction and sinter properties.

The process can be applied, preferably to the exchange of anions, but in the same way also to the exchange of cations, for the preparation of powders from sols which are stabilized under basic conditions (for example $SiO_2$-powders of waterglass or silica sols).

Accordingly, the process according to the invention is particularly suitable for the preparation of powders of sphere-shaped particles, of various compositions and for various intended uses:

Structural or functional ceramics having a homogeneous chemical composition (also dopes), good compaction properties and low phase formation and sinter temperatures;

Glass powders and glasses of compositions which are not accessible via melts, for example because the melting temperature is too high and/or the tendency to recrystallize is too high;

Composites between ceramics, glasses, metals and organic components.

The following examples illustrate the process according to the invention without restricting it thereto.

EXAMPLE 1

Preparation of the aqueous solutions and/or sols

(a) $ZrO_2$—$Y_2O_3$ 109.2 g of $Zr(OC_3H_7)$. (75%), corresponding to 0.25 mole, are dissolved in 75 ml of ethanol and the solution is treated with 22 ml of conc. $HNO_3$ (65% strength) and 25 ml of $H_2O$. The mixture is evaporated twice on the rotary evaporator at 60° C. and again taken up in distilled water, and this results in a clear, aqueous sol. 5.76 g of $Y(NO_3)_3 \times 6H_2O$ are dissolved in 20 ml of $H_2O$, and the solution is added to the $ZrO_2$ sol. The total volume of the sol is then adjusted to 100 ml.

(b) $ZrO_2$-$Al_2O_3$

A procedure as described under a) is initially followed to prepare the $ZrO_2$ sol. A completely peptizable aluminum oxide hydroxide (Disperal, made by Condea) is then added to this sol. In doing this, any desired mixing ratio between the two components can be chosen. For example, 9.1 g of AlOOH are added to the above-described 0.25 molar $ZrO_2$ batch in order to prepare 20% of $Al_2O_3$ and 80% of $ZrO_2$.

(c) $ZrSiO_4$

A procedure as described under a) is initially followed. 15 g of highly-disperse $SiO_2$ (Aerosil, made by Degussa) are then added to the $ZrO_2$ sol.

(d) $Pb(Zr,Ti)O_3$ 23.0 g of $Zr(OC_3 H_7)_4$ (74.1%) and 11.75 g of Ti-$(OC_2H_5)_4$ (93.2%) are dissolved in 45 ml of ethanol, and the solution is treated with 7 ml of $HNO_3$ (65% strength) and 10 ml of $H_2O$. The mixture is evaporated twice on a rotary evaporator at 60° C. and again taken up in distilled water, and this results in a clear, aqueous sol. 33.12 g of $Pb(NO_3)_2$ are dissolved in 85 ml of $H_2O$, the solution is mixed with the sol, and the total volume is adjusted to 150 ml. The stoichiometric composition of this mixture corresponds to the reaction product $Pb(Zr_{0.52}Ti_{0.48})O_3$.

(e) $BaTiO_3$ 12.24 g of $Ti(OC_2H_5)_4$ (93.2% pure) are dissolved in 15 ml of ethanol, and the solution is treated with 3.5 ml of $HNO_3$ (65% strength) and 5 ml of $H_2O$. The mixture is evaporated twice on a rotary evaporator at 60° C. and again taken up in distilled water, and this gives a slightly cloudy, aqueous sol. 13.07 g of $Ba(NO_3)_2$ are dissolved in 125 ml of $H_2O$, the solution is mixed with the sol, and the total volume is adjusted to 150 ml.

(f) $YBa_2Cu_3O_7-x$ 3.83 g of $Y(NO_3)_3 \times 6H_2O$, 5.23g of $Ba(NO_3)_2$ and 7.25 g of $Cu(NO_3)_2 \times 3H_2O$ are dissolved under hot conditions in 120 ml of $H_2O$, and the complete solution is adjusted to 150 ml after cooling.

EXAMPLE 2

Preparation of the emulsions

The processing of the aqueous solutions is identical for all the substance systems described under Example 1.

Per 100 ml of aqueous phase to be emulsified 1 g of emulsifier (Emulsogen® OG, made by Hoechst) is dissolved in 250 ml of petroleum spirit (boiling range 50° to 70° C.), and the aqueous and organic phases are combined. The emulsion is then prepared using an Ultraturax (made by IKA) in a flow cell.

EXAMPLE 3

Ion exchange

Before the ion exchange is started, 1 mole per cent of didodecyldimethylammonium bromide, relative to the amount of anions to be exchanged, is dissolved in n-octanol at a concentration of 1 g/5 ml, and the solution is added to the emulsion. The exchange is then carried out using a column packed with Dowex 1×8 (made by Dow Chemical), a strongly basic ion exchanger. The amount of ion exchanger is calculated from the ion-exchange capacity, the amount of anions to be exchanged and a sufficient safety reserve i.e., for example, 500 g of Dowex are employed for 250 mmoles of anions to be exchanged. The ion exchange is checked using pH indicator strips and nitrate indicator strips.

EXAMPLE 4

Drying

Before the water is removed by azeotropic distillation, ten per cent by volume of n-butanol, relative to the total amount of water, are added to the emulsion; this causes the water concentration in the azeotropic mixture to rise from about 5% to 20%. After the distillation, the particles which have formed are filtered off, redispersed in petroleum spirit, refiltered and dried.

EXAMPLE 5

Calcining

Calcination of the powders in a temperature range of up to 650° C. leads to decomposition of traces of nonexchanged nitrates, to evaporation or pyrolysis and to burning out of adsorbed organic constituents (for example emulsifiers) and to formation of the oxides from the hydroxides (oxide hydrates).

Depending on the substance system, even higher temperatures are in some cases then required for compacting the individual particles and for the formation of the desired phases.

The powders are processed using conventional ceramic technologies.

We claim:

1. A process for the preparation of a suspension which contains sphere-shaped oxide particles which comprises emulsifying a solution or sol, containing at least one element which can be precipitated as an oxide or oxide hydrate, to produce an emulsion in an organic liquid which contains therein at least one compound, added before, during or after the formation of the emulsion, which acts as a phase transfer catalyst and which replaces the anions or cations present in the emulsified water droplets by hydroxide ions or protons thus causing precipitation of said oxide particles in the droplets.

2. A process as claimed in claim 1, wherein an emulsifier is employed for forming the emulsion.

3. A process as claimed in claim 1, wherein the oxide or oxide hydrate to be precipitated is a neutral or basic oxide and the compound which acts as the phase transfer catalyst introduces hydroxide ions into the aqueous phase.

4. A process as claimed in claim 1 wherein the element to be precipitated as an oxide or oxide hydrate is selected from the group consisting of alkaline earth metals, of lanthanides, and of the sub-group metals.

5. A process as claimed in claim 1, wherein tetraalkyl or tetraalkylammonium halides are employed as the compound acting as the phase transfer catalyst.

6. A process as claimed in claim 1, wherein the organic liquid employed is selected from halogenated and non-halogenated aliphatic or aromatic hydrocarbons or a mixture thereof.

7. A process as claimed in claim 1, wherein the volumetric proportion of the aqueous phase in the emulsion is 15 to 45%.

8. A process as claimed in claim 1, wherein the aqueous phase is adjusted to an average droplet size in the range of from 0.1 to 5 $\mu$m before precipitation is started.

9. A process as claimed in claim 1, wherein a substoichiometric amount of the compound which acts as the phase transfer catalyst is employed, and this compound is regenerated continuously or batchwise.

10. A process as claimed in claim 9 wherein an ion exchanger is used for regenerating the compound which acts as the phase transfer catalyst.

11. A process as claimed in claim 9 wherein the precipitation of the oxide or oxide hydrate and the regeneration of the compound which acts as the phase transfer catalyst are carried out simultaneously.

12. A suspension containing sphere-shaped oxide particles, obtainable by the process as claimed in claim 1.

13. A process for the preparation of ceramic oxides and ceramic shaped articles which comprises the use of the suspension obtained by the process as claimed in claim 1.

14. A process as claimed in claim 2, wherein the emulsifier is a non-ionic emulsifier.

15. A process as claimed in claim 4, wherein the element to be precipitated as an oxide is selected from the group consisting of barium, yttrium, titanium, zirconium, niobium, tantalum, tungsten, aluminum, silicon, tin and lead.

* * * * *